Figure 4:
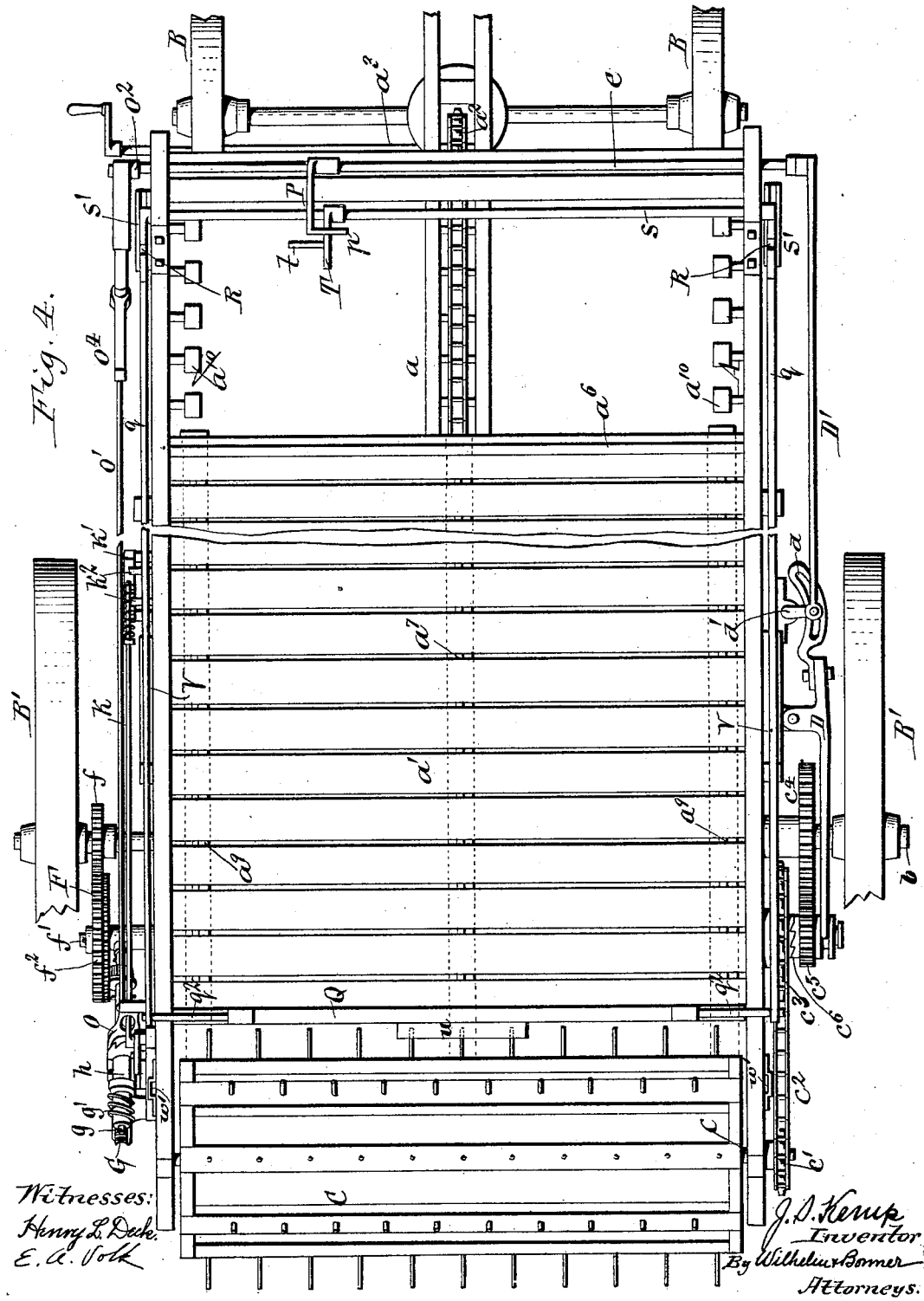

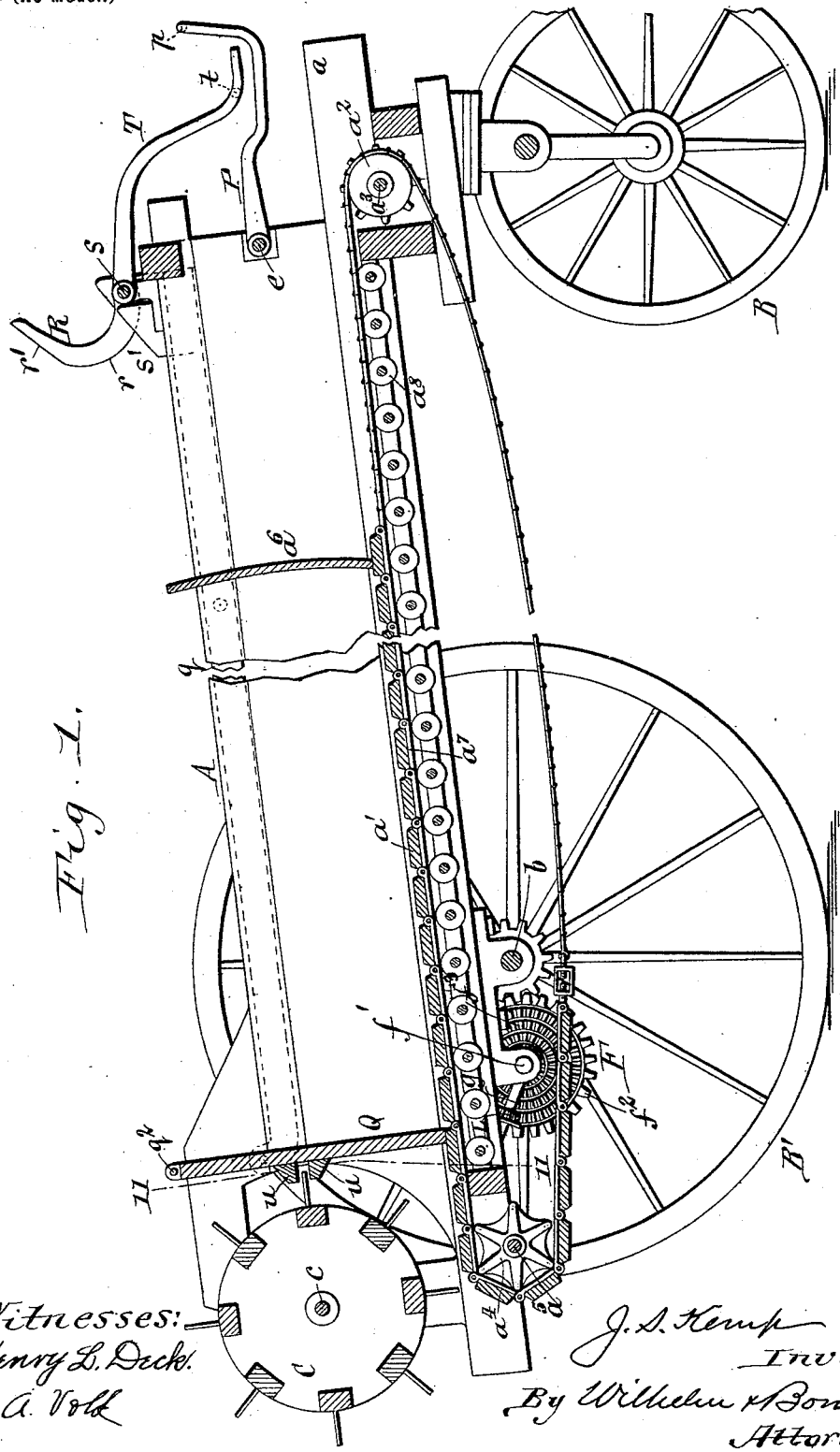

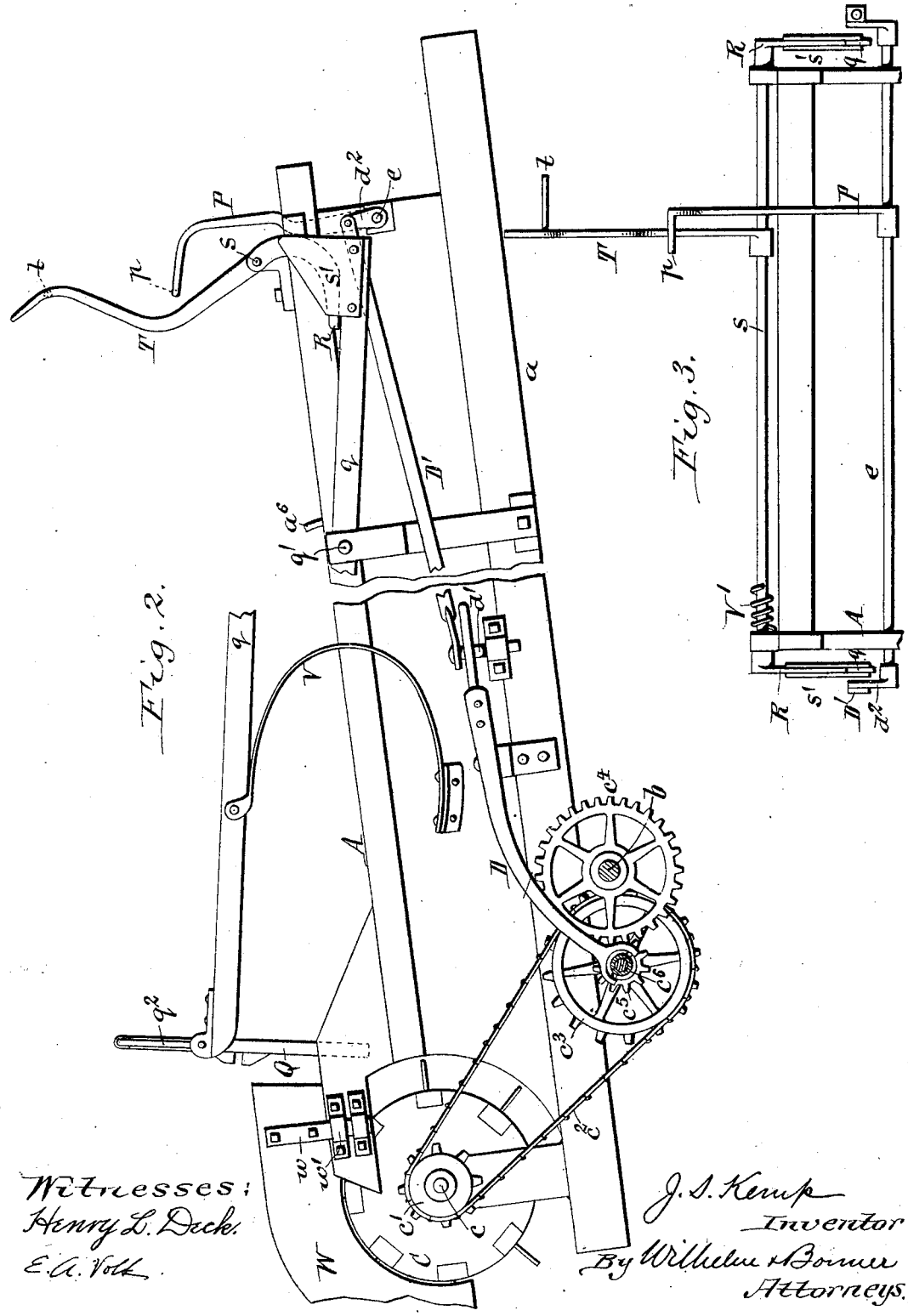

No. 632,124. Patented Aug. 29, 1899.
J. S. KEMP.
MANURE SPREADER.
(Application filed May 18, 1899.)
(No Model.) 5 Sheets—Sheet 3.

Witnesses:
Henry L. Deck.
E. A. Volk.

J. S. Kemp
Inventor
By Wilhelm & Bonner
Attorneys.

No. 632,124. Patented Aug. 29, 1899.
J. S. KEMP.
MANURE SPREADER.
(Application filed May 18, 1899.)
(No Model.) 5 Sheets—Sheet 4.
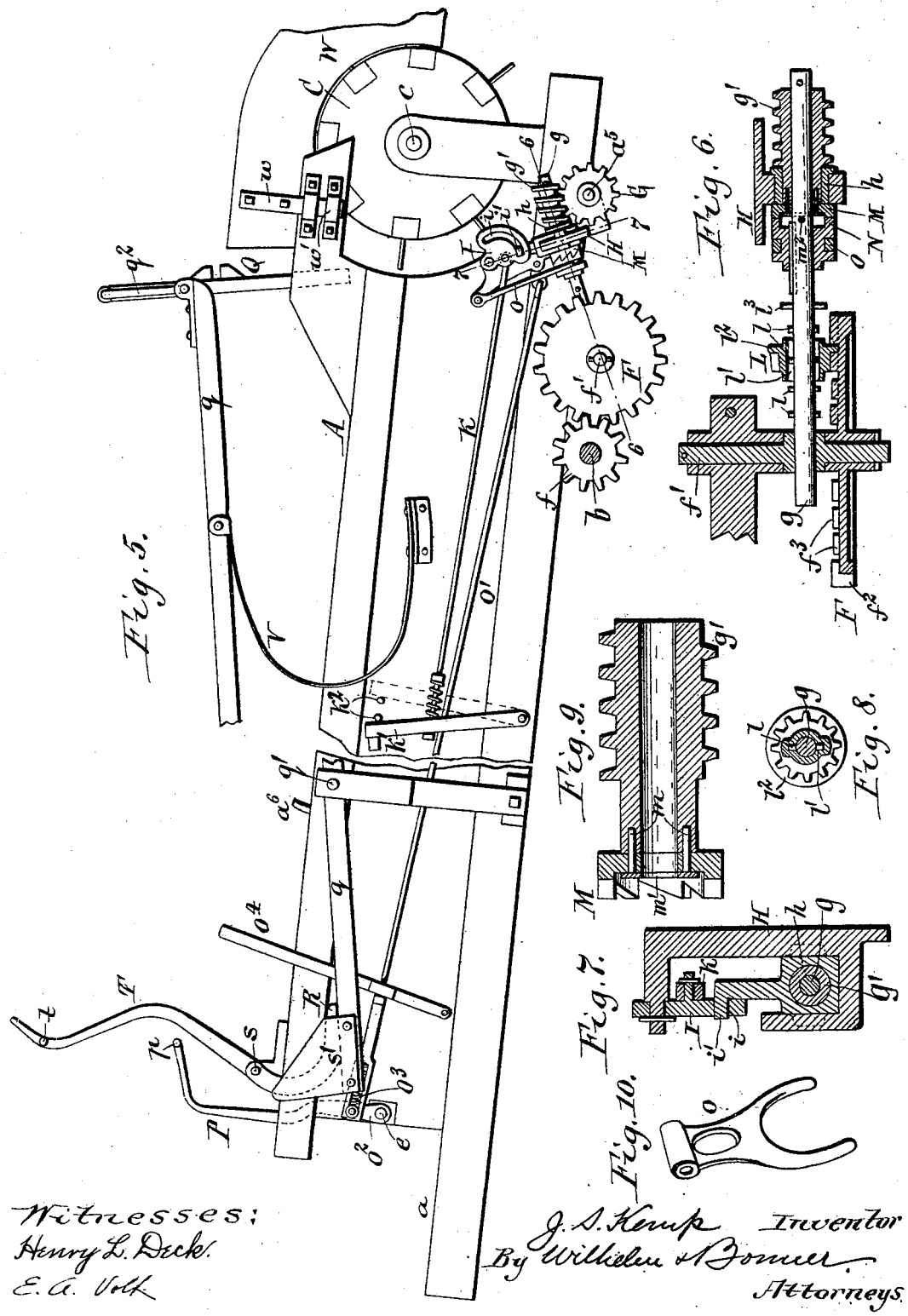
Witnesses:
Henry L. Deck.
E. A. Volk
J. S. Kemp Inventor
By Wilhelm & Bonner
Attorneys No. 632,124. Patented Aug. 29, 1899.
J. S. KEMP.
MANURE SPREADER.
(Application filed May 18, 1899.)
(No Model.) 5 Sheets—Sheet 5.
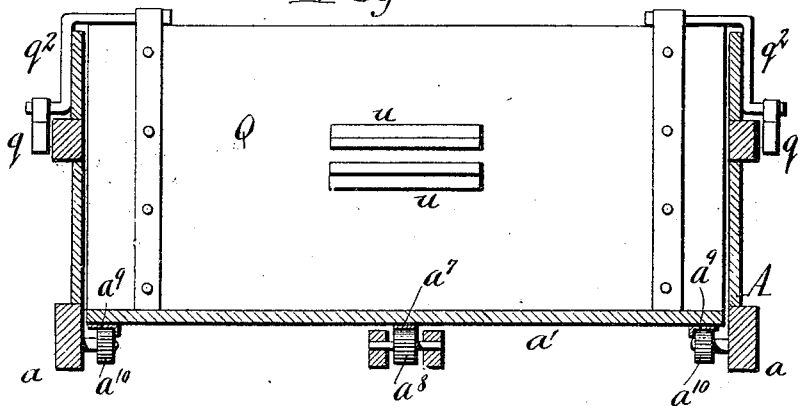
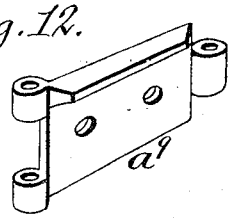
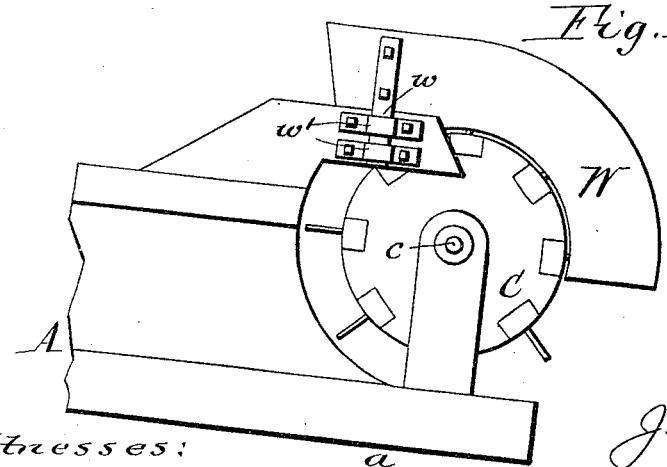
Witnesses:
Henry L. Deck.
E. A. Volk.
J. S. Kemp
Inventor
By Wilhelm & Bonner
Attorneys.
THE NORRIS PETERS CO., PHOTO-LITHO., WASHINGTON, D. C.

UNITED STATES PATENT OFFICE.

JOSEPH SARGENT KEMP, OF SYRACUSE, NEW YORK.

MANURE-SPREADER.

SPECIFICATION forming part of Letters Patent No. 632,124, dated August 29, 1899.

Application filed May 18, 1899. Serial No. 717,305. (No model.)

*To all whom it may concern:*

Be it known that I, JOSEPH SARGENT KEMP, a citizen of the United States, residing at Syracuse, in the county of Onondaga and State of New York, have invented new and useful Improvements in Manure-Spreaders, of which the following is a specification.

This invention relates to that class of manure-spreaders which contain a box mounted on a wheeled frame and in which the body or charge of manure or other fertilizer rests upon a movable bottom by which the manure is slowly moved rearwardly in the box against a toothed beater which removes the manure from the rear end of the body or pile and throws it rearwardly from the machine.

In loading the box with a charge of manure or fertilizing matter the latter is loaded directly against the beater, whereby the teeth of the latter become so embedded in the material that breakage is liable to occur when the machine is started. In order to avoid such breakage, it is customary to adjust the movable bottom for loading with its follower-board a few inches rearward of its extreme forward position and to move the bottom forward to its extreme forward position after loading and before starting the machine. This forward movement of the bottom moves the rear end of the pile away from the beater and furnishes sufficient clearance for the beater to start freely. This clearing of the beater before starting is, however, often overlooked or neglected, in which case breakage is liable to result.

The principal object of my invention is to provide the machine with efficient and convenient means for preventing the beater from becoming clogged in loading, and this means consists, briefly stated, of a safety board or gate which is arranged in the rear portion of the box in front of the beater and which is lowered into the box before loading and protects the beater while loading and is raised out of the box before starting the machine.

In the accompanying drawings, consisting of five sheets, Figure 1 is a longitudinal vertical section of a manure-spreader provided with my improvements. Fig. 2 is a fragmentary elevation of the right-hand side of the machine. Fig. 3 is a front elevation thereof. Fig. 4 is a top plan view. Fig. 5 is a fragmentary elevation of the left-hand side of the machine. Fig. 6 is a horizontal section in line 6 6, Fig. 5, of the bottom-actuating gearing, on an enlarged scale. Fig. 7 is a vertical section in line 7 7, Fig. 5, on an enlarged scale. Fig. 8 is a sectional rear elevation of the adjustable pinion on the worm-shaft, on an enlarged scale. Fig. 9 is an enlarged longitudinal section of the worm and its clutch. Fig. 10 is a perspective view of the pendent shifting arm of the worm-clutch. Fig. 11 is a cross-section through the box in rear of the safety-board in line 11 11, Fig. 1, showing the board in its lowered position. Fig. 12 is a perspective view of a link of one of the side chains of the bottom. Fig. 13 is a side elevation of the rear portion of the box, showing one of the wind-breaks on the side of the beater.

Like letters of reference refer to like parts in the several figures.

A represents the box or body, $a$ the bottom frame thereof, and $a'$ the movable bottom running with its endless center chain around a front sprocket-wheel $a^2$ on a transverse shaft $a^3$ and a rear sprocket-wheel $a^4$ on a transverse shaft $a^5$. $a^6$ is the follower-board, mounted on the front end of the movable bottom. B represents the front wheels, and B' the rear wheels, on which the body or box is supported. $b$ represents the axle of the rear wheels, from which the movable bottom and the beater are driven, as usual, by trains of gears arranged, respectively, on the left and right hand sides of the machine. All of these parts may be of any ordinary or suitable construction.

$a^7$, Fig. 11, represents the center chain of the bottom, running over rollers $a^8$ and the sprocket-wheel $a^4$, and $a^9$ the side chains, running over rollers $a^{10}$. The links of the center chain are constructed without any flanges, and the links of each side chain are constructed with a longitudinal side flange only on one side of the chain, preferably the inner side, as shown in Figs. 11 and 12, leaving the opposite side of each link unobstructed by a flange. These side flanges sustain the bottom against lateral displacement and enable the side chains to clear themselves of any solid matter which may fall on the same when the links are inverted below the sprocket-wheel. When the center links are provided with flanges on both sides, such solid matter is liable to lodge on the links and to wedge between the links and the sprocket-wheel as the bottom is moved back for loading, sometimes causing the chain to be bent or the bottom slats to be split. Furthermore, the flanged side chains $a^9$ do not run around any sprocket-wheel, and therefore no wedging of lodged material between these links and a sprocket-wheel can take place, while the center chain $a^7$, which is the drive-chain of the bottom, has its links constructed with smooth or unflanged under sides on which material cannot lodge.

C represents the beater, which also may be of any suitable construction and is mounted in the rear portion of the machine, as usual. The beater shown in the drawings is a rotary beater secured to a shaft $c$, which is provided with a sprocket-wheel $c'$ on the right-hand side of the machine. The beater is driven, as usual, by a chain $c^2$, Figs. 2 and 4, running around the sprocket-wheel $c'$, and a sprocket-wheel $c^3$, mounted on a stud in rear of the rear axle $b$ and driven therefrom by a gear-wheel $c^4$, pinion $c^5$, and clutch $c^6$, as described, for instance, in Letters Patent No. 616,621, granted to me December 27, 1898. This beater-clutch is shifted by a lever D, pivoted to the right-hand side of the machine, as usual, in front of the rear axle and connected at its rear end with the movable member of the clutch and provided at its front end with a slotted segment $d$. A pivoted arm $d'$ engaging in this segment is moved back and forth by a longitudinal shifting-rod D', connected at its front end with an arm or crank $d^2$, mounted on the right-hand end of a transverse rock-shaft $e$. Any other suitable clutch-shifting mechanism may, however, be employed, if desired.

The actuating-gearing for the movable bottom, which is arranged on the left-hand side of the machine in rear of the rear axle, is also in its main features constructed and arranged as usual. As shown in the drawings, Figs. 4 to 10, this gearing is constructed as follows:

$f$ represents the driving spur-gear, which is secured to the rear axle $b$ on the inner side of the left-hand wheel B' and which meshes with a gear-wheel F, mounted on a pivoted arbor $f'$ in rear of the rear axle. The gear-wheel F has a spur-gear face $f^2$, by which it meshes with the wheel $f$, and has on its inner flat side several concentric gear-rims $f^3$, separated by annular spaces.

$g$ represents the longitudinal worm-shaft, which is supported at its front end in the arbor $f'$ and extends rearwardly therefrom and carries at its rear end the worm $g'$, which meshes with the worm-wheel G on the shaft $a^5$, by which the movable bottom is driven. The rear end of the worm-shaft is vertically movable to disconnect the worm from the worm-wheel when desired. The worm-shaft is mounted for this purpose in front of the worm in a bearing $h$, which surrounds the neck of the worm and which is vertically movable in a guide-frame H. It is raised and lowered by a cam I, pivoted above said bearing and having an eccentric-slot $i$, in which engages a hook or head $i'$, formed on the upper portion of the bearing. This cam is actuated by a shifting-rod $k$, extending forwardly to a hand-lever $k'$, which is locked against suitable stops $k^2$. The worm-shaft is driven from the gear-wheel F by a pinion L, which can be shifted on the shaft to engage with either of the gear-rims $f^3$ of the wheel F, thereby changing the speed of the worm-shaft in a well-known manner. This pinion is coupled with the worm-shaft, which latter is round, by coupling-pins $l$, secured in the shaft at the proper points and entering longitudinal grooves $l'$, formed in the hub of the pinion. The latter has a flange $l^2$ which engages in the annular space between the concentric gear-rims, whereby the pinion is held in its adjusted position, as usual, the wheel F being moved in and out on the arbor when the pinion is shifted. In the rearmost position of the pinion this flange stands outside of the wheel F and holds the pinion only against forward movement. The pinion is held in this position against rearward movement by a stop-pin $l^3$, which is longer than the coupling-pins, and therefore cannot enter the grooves of the hub. The grooves in the hub and the pins in the worm permit the use of a round shaft and correspondingly-bored hub and form a very simple and satisfactory coupling.

The worm is mounted loosely on the worm-shaft and is coupled therewith by a clutch. The immovable member M of the clutch is secured to the front end of the worm in front of the bearing $h$, preferably, as shown in Fig. 9, by longitudinal pins $m$, passing through the hub of this clutch member into the front end of the worm and held in place by a washer $m'$ and a pin $m^2$. The movable member N of this clutch is splined on the worm-shaft, so as to turn therewith while being capable of movement toward and from the immovable member M. The movable member N is shifted by a depending shifting arm O, which straddles with its lower bifurcated end the movable member and is provided in its upper portion with an opening, through which the shifting-rod $k$ of the cam passes. The arm O is moved by a shifting-rod O', which extends forwardly to a short crank $O^2$, secured to the left-hand end of the transverse front shaft $e$, so that both the beater-clutch and the bottom or worm clutch are simultaneously engaged or disengaged by the movement of this shaft. The front end of the shifting-rod O' is connected with the crank $O^2$ by a well-known yielding connection $O^3$, consisting of a sleeve and spring, and is also connected with a hand-lever $O^4$, by which the bottom clutch can be disengaged without moving the shaft $e$, and therefore without disengaging the beater-clutch.

P represents the hand-lever on the shaft $e$, by which the latter is moved to engage or disengage the clutches and which projects forwardly from the shaft when the clutches are disengaged, as shown in Fig. 1, and projects upwardly when the clutches are engaged, as shown in Figs. 2, 3, and 5.

Q represents the safety board or gate, which is arranged immediately in front of the beater and capable of vertical movement, so that it can be lowered into the box or body of the machine to protect the beater when filling the box and can be raised out of the box to allow the material to be fed against the beater. This board is attached to the rear ends of two levers $q$, which are arranged lengthwise on both sides of the box and pivoted to the same by bolts $q'$. The latter are so located that the rear arms of these levers are considerably longer than their front arms, whereby a comparatively short movement of the front ends of the levers produces the desired movement of the board. The board is connected with the rear ends of the levers by arms $q^2$, which are secured at their upper ends to the board and pivoted at their lower ends to the levers or by other suitable means.

In the preferred construction of the safety-board the arms $q^2$, which connect the board with the levers $q$, project downwardly on the outer sides of the side pieces of the box or body when the board has been lowered, as represented in Fig. 11, and stand in such proximity to the side pieces that they prevent the latter from spreading under the outward pressure of the load. When the board has been raised out of the box, the sides of the latter are no longer confined by these depending arms $q^2$, but can spread or spring outward to a certain extent, thereby easing the friction between the side pieces and the sides of the body of manure and enabling the latter to be fed more easily against the beater.

The levers are actuated at their front ends by cam-arms R, which are secured to the ends of a transverse rock-shaft $s$, arranged above the front portion of the box or body and above the front ends of the levers. Each of the levers is provided at its front end with a shoe $s'$, upon which the cam-arm bears and which has upwardly-projecting side flanges by which lateral displacement of the parts is prevented. The weight of the board and connecting parts presses these shoes upward and against the under sides of these cam-arms. Each of the latter is provided with a curved lifting-face $r$ and a straight locking-face $r'$. As the cam-levers are swung down their curved faces press down upon the shoes of the side levers and depress the same, while the straight locking-faces bear against the shoes when the front ends of the levers have been sufficiently depressed and lock the levers in this position.

T represents a hand-lever secured to the rock-shaft $s$ for manipulating the latter. This hand-lever is arranged near the hand-lever P, by which the clutch-controlling shaft $e$ is moved and projects forwardly and downwardly when the front ends of the safety-board levers are raised and the board is lowered, as represented in Fig. 1, and upwardly when the board is raised, as represented in Figs. 2, 3, and 5. When the hand-lever P is in its lower position, in which the bottom and beater clutches are disengaged and the hand-lever T stands also in its lower position, in which the board stands in front of the beater, the front end of the board hand-lever T stands slightly above the clutch hand-lever P, as shown in Fig. 1. The board hand-lever T is provided near its front end with a transverse pin or stop $t$, which projects laterally over the clutch hand-lever P and prevents the latter from being raised. This prevents the clutches from being engaged and the bottom and beater from being started so long as the board is down and compels the operator to raise the board before starting the bottom and beater.

The clutch hand-lever P is provided near its front end with a transverse pin or stop $p$, which projects across the board hand-lever T when both hand-levers are raised, Fig. 3. This stop prevents the board hand-lever from being swung down and the board from being lowered so long as the clutches are engaged and the beater and bottom are moving and compels the operator to disengage the clutches before lowering the board.

It is sometimes desirable to allow the beater to run while the bottom is stopped—for instance, in passing over small areas where no manure is required. This can be done when both hand-levers are up by disengaging the floor-clutch by the extra hand-lever $O^4$, connected with the shifting-rod $O'$. This does not effect the beater-clutch, which remains in engagement.

The hand-lever $k'$, by which the worm is raised out of the worm-wheel, is resorted to, as is well known, when the bottom is to be moved by hand.

The safety-board is preferably provided on its rear side with two projecting cleats or ribs $u$, arranged one above the other in such a position that the row of beater-teeth which projects farthest forwardly can enter between these ribs, as shown in Fig. 1. When the board has been lowered, the beater is turned until one of its rows of teeth engages between these ribs. In this position the board stands as far forward as possible when in contact with the beater, which is the most desirable position for the board, as it then clears itself most readily from the beater and the body of the manure in being raised.

The safety-board not only protects the beater in loading and insures the easy starting of the machine and an even starting of the spreading operation, but it is also useful in confining wet manure or fine dry fertilizing material in the box in going from the pile to the place where the material is to be spread.

If desired, the overhanging weight of the safety-board and connecting parts can be balanced, in whole or in part, by a spring or springs applied in any suitable manner—for instance, by a spring V, applied to the side levers, as shown in Fig. 2, or by a spring V', applied to the rock-shaft s, as shown in Fig. 3.

W represents side wings or wind-breaks, which project rearwardly from the side pieces of the box near both ends of the beater and consist of boards or plates which project above and beyond the beater in rear of the safety-board and are preferably movably attached by bars or pins $w$, entering sockets $w'$. These wings or wind-breaks, of which only one may be used, if desired, prevent the wind from blowing across the beater end of the machine and permit an even spreading of light material in windy weather.

I claim as my invention—

1. In a manure-spreader, the combination with the box having a movable bottom and the rotary beater arranged over the rear portion of said bottom, of a safety board or gate arranged over said bottom adjacent to the front side of said beater and capable of vertical movement bodily toward and from said bottom, and mechanism whereby said board can be raised to expose the front side of the beater and lowered to cover the same, substantially as set forth.

2. In a manure-spreader, the combination with the box having a movable bottom and the rotary beater arranged over the rear portion of said bottom, of a safety board or gate arranged over said bottom adjacent to the front side of said beater and capable of vertical movement bodily toward and from said bottom, side levers pivoted to the sides of the box to swing vertically and connected at their rear ends to said board or gate, and means whereby the front ends of said levers are depressed to raise said board or gate, substantially as set forth.

3. The combination with the box having a movable bottom, and the beater, of a vertically-movable safety board or gate arranged adjacent to the beater, side levers connected at their rear ends with said board or gate, and rocking cam-arms bearing upon the front ends of said side levers, substantially as set forth.

4. The combination with the box having a movable bottom, and the beater, of a vertically-movable safety board or gate arranged adjacent to the beater, side levers connected at their rear ends with said board or gate, and rocking cam-arms bearing upon the front ends of said side levers, and having curved lifting-faces and straight locking-faces, substantially as set forth.

5. The combination with the box having a movable bottom, the beater, and the bottom-actuating mechanism, of a movable safety board or gate arranged adjacent to the beater, and a stop device which prevents the bottom-actuating mechanism from being thrown into gear before the safety board or gate has been raised, substantially as set forth.

6. The combination with the box having a movable bottom, the beater and the beater-actuating mechanism, of a movable safety board or gate arranged adjacent to the beater, and a stop device which prevents the beater-actuating mechanism from being thrown into gear before the safety board or gate has been raised, substantially as set forth.

7. The combination with the box having a movable bottom, the beater, the bottom-actuating mechanism and its clutch, and the shifting mechanism whereby said clutch is engaged or disengaged, of a vertically-movable safety board or gate arranged adjacent to the beater, mechanism whereby said board or gate can be raised or lowered, and a stop device which prevents said clutch from being engaged before the safety board or gate has been raised, substantially as set forth.

8. The combination with the box having a movable bottom, the beater, the bottom-actuating mechanism and its clutch, the beater-actuating mechanism and its clutch, and the shifting mechanism whereby said clutches are simultaneously engaged or disengaged, of a vertically-movable safety board or gate arranged adjacent to the beater, mechanism whereby said board or gate can be raised or lowered, and a stop device which prevents the clutches from being engaged before the safety board or gate has been raised, substantially as set forth.

9. The combination with the box having a movable bottom, the beater, the bottom-actuating mechanism and its clutch, the rock-shaft by which said clutch is shifted and a hand-lever secured to said shaft and provided with a projecting stop, of a vertically-movable safety board or gate arranged adjacent to the beater, a rock-shaft whereby said board or gate can be raised or lowered, and a hand-lever arranged on said rock-shaft in the path of said stop, substantially as set forth.

10. The combination with the box having a movable bottom, the beater, the bottom-actuating mechanism and its clutch, and the shifting mechanism whereby said clutch is engaged or disengaged, of a vertically-movable safety board or gate arranged adjacent to the beater, mechanism whereby said board or gate can be raised or lowered, a stop device which prevents said clutch from being engaged before the safety board or gate has been raised, and a stop device which prevents the safety board or gate from being lowered before said clutch has been disengaged, substantially as set forth.

11. The combination with the box having a movable bottom, the beater, the bottom-actuating mechanism and its clutch, the rock-shaft by which said clutch is shifted, and a hand-lever secured to said shaft and provided with a projecting stop, of a vertically-movable safety board or gate arranged adjacent to the beater, a rock-shaft whereby said board can be raised or lowered, and a hand-lever arranged on said rock-shaft in the path of said stop and provided with a stop which stands in line with the hand-lever by which the bottom clutch is actuated, substantially as set forth.

12. The combination with the body-frame, the beater, and the vertically-movable safety-board arranged in front of the beater, of depending arms which are secured to said board and overlap the side pieces of the body-frame and confine the same against spreading when the board is lowered, substantially as set forth.

13. The combination with the body-frame and the beater, of the vertically-movable safety-board arranged in front of the beater, the side levers, and the depending arms which connect the safety-board to the side levers and project downwardly on the outer sides of the side pieces of the body-frame, whereby said side pieces are confined against spreading when the board is lowered and released when the board is raised, substantially as set forth.

14. The combination with the box, its movable bottom, the transverse shaft by which said bottom is actuated and the worm-wheel secured thereto, of the longitudinal vertically-movable worm-shaft, the worm mounted loosely on the rear end thereof and provided at its front end with a clutch member, the movable clutch member splined on said worm-shaft, shifting mechanism connected with said movable clutch member, and lifting mechanism connected with the worm-shaft, substantially as set forth.

15. The combination with the worm-shaft, of the worm mounted loosely on the rear end thereof, a clutch member arranged against the front end of the worm and coupled thereto by longitudinal coupling-pins held in place by a washer surrounding the worm-shaft and a pin secured in said shaft, and a movable clutch member arranged on the worm-shaft, substantially as set forth.

16. The combination with the driving gear-wheel provided with several concentric gear-rims and the round worm-shaft, of an adjustable pinion arranged on said worm-shaft and having the round bore of its hub provided with a longitudinal groove, coupling-pins arranged on the worm-shaft and adapted to project into said groove, and a stop-pin which confines the pinion against rearward movement beyond its rearmost position, substantially as set forth.

17. The combination with the body-frame having two series of supporting-rollers arranged along its sides, of a movable slat bottom having its slats connected along each side of the bottom by guide-links running on said rollers and each provided with a depending side flange on one side only, while the opposite side of the link is unobstructed, and having the slats connected at the middle by driving-links which have smooth under sides, and a central driving sprocket-wheel engaging with said central links, substantially as set forth.

18. The combination with the body-frame and the beater arranged at the rear end of the same, of a side wing secured to the body-frame and projecting upwardly and rearwardly beyond the beater, thereby acting as a wind-break at the rear end of the machine, substantially as set forth.

Witness my hand this 15th day of May, 1899.

JOSEPH SARGENT KEMP.

Witnesses:
E. A. O'BRIEN,
GARRETT H. BROWN.